(12) United States Patent
Se-Hee et al.

(10) Patent No.: US 9,196,901 B2
(45) Date of Patent: Nov. 24, 2015

(54) LITHIUM BATTERY ELECTRODES WITH ULTRA-THIN ALUMINA COATINGS

(76) Inventors: Lee Se-Hee, Louisville, CO (US);
Steven M. George, Boulder, CO (US);
Andrew S. Cavanagh, Boulder, CO (US); Jung Yoon Seok, Seoul (KR);
Anne C. Dillon, Boulder, CO (US)

( * ) Notice: Subject to any disclaimer, the term of this patent is extended or adjusted under 35 U.S.C. 154(b) by 610 days.

(21) Appl. No.: 13/159,352

(22) Filed: Jun. 13, 2011

(65) Prior Publication Data

US 2012/0077082 A1    Mar. 29, 2012

Related U.S. Application Data

(60) Provisional application No. 61/354,288, filed on Jun. 14, 2010.

(51) Int. Cl.
| | |
|---|---|
| *H01M 4/04* | (2006.01) |
| *H01M 4/485* | (2010.01) |
| *H01M 4/505* | (2010.01) |
| *H01M 4/525* | (2010.01) |
| *H01M 4/58* | (2010.01) |
| *H01M 4/62* | (2006.01) |
| *H01M 10/0525* | (2010.01) |

(52) U.S. Cl.
CPC ............ *H01M 4/485* (2013.01); *H01M 4/0402* (2013.01); *H01M 4/505* (2013.01); *H01M 4/525* (2013.01); *H01M 4/5825* (2013.01); *H01M 4/628* (2013.01); *H01M 10/0525* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 6,365,299 B1 * | 4/2002 | Miyaki et al. | 429/218.1 |
| 2005/0042515 A1 * | 2/2005 | Hwang et al. | 429/231.95 |
| 2005/0084760 A1 * | 4/2005 | Hwang et al. | 429/234 |
| 2005/0250008 A1 * | 11/2005 | Mizutani et al. | 429/209 |
| 2006/0134527 A1 * | 6/2006 | Amine et al. | 429/326 |
| 2009/0136855 A1 * | 5/2009 | Yamaguchi et al. | 429/343 |

FOREIGN PATENT DOCUMENTS

WO    WO2008/116694    * 10/2008 ............ H01M 4/66

OTHER PUBLICATIONS

Beetstra et al., Improved Li-Ion Battery Performance by Coating Cathode Nano-Particles using Atomic Layer Deposition, 2007, Refereed Proceedings The 12th Internaltion Conference on Fluidization-New Horizons in Fluidization Engineering, pp. 369-376.*

* cited by examiner

*Primary Examiner* — Maria J Laios
(74) *Attorney, Agent, or Firm* — Gary C. Cohn PLLC (57) ABSTRACT

Electrodes for lithium batteries are coated via an atomic layer deposition process. The coatings can be applied to the assembled electrodes, or in some cases to particles of electrode material prior to assembling the particles into an electrode. The coatings can be as thin as 2 Ångstroms thick. The coating provides for a stable electrode. Batteries containing the electrodes tend to exhibit high cycling capacities.

6 Claims, 4 Drawing Sheets

ID_BATTERY ELECTRODES WITH
ULTRA-THIN ALUMINA COATINGS

This application claims priority from U.S. Provisional Patent Application No. 61/354,288, filed 14 Jun. 2010.

STATEMENT OF GOVERNMENT INTEREST

This invention was made with government support under DE-FG02-08ER86337, awarded by the U.S. Department of Energy. The government has certain rights in the invention.

Lithium ion batteries form a fast-growing segment of the battery market. They are of great interest in many applications, including hybrid vehicles and plug-in hybrid vehicles. These batteries are often manufactured with a lithium-transition metal oxide or a lithium-transition metal phosphate cathode and a graphite electrode. The electrodes are generally formed from starting powders which are held together by one or more binder materials. For this reason, the electrodes tend to have porous structures.

These electrodes suffer from performance limitations. The stability of the lithium-containing cathode is a significant concern. The most commercialized cathode material is a $Li_{1-x}Co_xO_2$ electrode. For practical applications, x is limited to ≤0.5, because if x>0.5, the electrode stability deteriorates rapidly when potentials higher than 4.2-4.3 V (vs. Li/Li+) are used.

On the anode side, a major limitation is that an exothermic reaction between the electrode and the electrolyte that forms the solid electrolyte interphase (SEI) layer during charging and discharging. The SEI layer can degrade the battery performance and safety.

To address these problems, surface modifications have been introduced onto these electrodes. Metal oxide and metal phosphate coatings have been applied to lithium-transition metal oxide and lithium-transition metal phosphate cathodes; improvements in cycle performance and safety have been reported with the use of those coatings.

For example, zirconium oxide, aluminum oxides, titanium dioxide and boron oxide coatings have been applied using a sol gel method to rather large (micron-sized) lithium cobalt oxide particles (Cho et al., *Angew. Chem. Int. Ed.* 2001, 40, 3367). The zirconium oxide and aluminum oxide coatings are reported as leading to significant improvements in battery cycling performance. However, the sol gel coating method described there produces very thick coatings, which significantly increase costs while significantly decreasing gravimetric capacity. The process is amenable only to larger particles, but smaller particles (<500 nm, preferably <200 nm in largest dimension) are preferred for lithium ion battery electrodes due to their larger surface area to volume ratio. In addition, the sol gel coating method leads to large losses of reagents and is not economically feasible on an industrial scale.

Graphite electrodes have been coated with materials such as amorphous carbon, alumina, zirconium oxide, aluminum phosphate. However, the coating approach has not been entirely successful, in some cases because it is difficult to obtain a uniform coating over all exposed surfaces, and in other cases because the coating interferes with important attributes of battery performance, such as cycling performance. A more effective approach to stabilizing the anode and/or cathode of a lithium battery is desired.

In one aspect, this invention is a process for preparing a lithium ion battery electrode, comprising shaping a mixture of particles of a cathode or anode material and a binder to form a shaped lithium ion battery electrode in which the particles are held together by the binder, and applying a coating to the shaped lithium ion battery electrode via an atomic layer deposition process.

Electrodes made in this manner perform very well when used as the cathode or anode in a lithium ion battery. The electrode tends to be quite stable, and as a result the cycling capacity of the battery remains high. Only very thin coatings are needed to obtain this effect; in the case of alumina coatings, benefits are seen at coating thicknesses as thin as about 2 Ångstroms. This result is quite different than what is seen when coatings are applied using a sol-gel process as described in *Angew. Chem. Int. Ed.* 2001, 40, 3367, in several respects. First, the coatings are much thinner than can be applied in the sol-gel process, which reduces costs and can increase the volumetric capacity of the electrode. Second, when a coating is applied in the ALD process, increasing the thickness can lead to a dramatic drop in battery performance. With alumina coatings, this drop in properties is seen at coating thicknesses as small as 15-20 Ångstroms. The difference in performance may be due to the greater conformality and the relative absence of defects such as pinholes in the ALD-applied coatings, compared to coatings applied in the sol-gel process.

Another very significant difference from the sol-gel process is that, in this aspect of the invention, the coating is applied to the electrode after the anode or cathode particles have been bound together, not to the starting particles themselves. It is very surprising that good performance could be obtained by performing the coating step after the anode or cathode particles have been assembled into an electrode. Experimental evidence indicates that, despite the presence of the binder, the reagents used in the ALD coating process are able to penetrate through the binder well into the body of the electrode and deposit onto the surfaces of the embedded particles.

It is still more surprising that, at least in some cases, significantly better results are obtained by coating the electrode rather than the starting particles. This is most clearly seen when anodes, particularly those made using graphitic particles as the anode material, are coated using the ALD process. It has been found that coating the graphite particles themselves using an ALD process often provides little or no benefit, compared to simply leaving the particles uncoated. However, it has very unexpectedly been found that when the electrode is coated using ALD methods, very significant improvements in battery performance are obtained.

This effect tends to be much smaller in the case of cathodes. In the case of cathodes, very similar results have been obtained when the particles themselves are coated, or when the electrode is coated. Thus, in a second aspect, this invention is a process for preparing a lithium ion battery cathode, comprising applying a coating having a thickness of about 2 to about 100 Ångstroms onto the surfaces of particles of a cathode material via an atomic layer deposition process, and then mixing the coated particles with a binder and shaping the mixture into an electrode in which the coated particles are held together by the binder.

This invention is also a lithium ion battery cathode comprising particles of a cathode material bound together with a binder, wherein at least a portion of the particles are at least partially coated with a protective layer of from about 2 to about 100 Ångstroms in thickness.

This invention is also a lithium ion battery electrode which is coated with a protective layer having a thickness of from 2 to about 100 Ångstroms.

Lithium ion battery electrodes useful herein typically include particles of a cathode material and an anode material each of which are held together using a suitable binder. Other materials may be present in or on the electrode.

The cathode material is one that can reversibly intercalate (insert) lithium ions during a battery discharge cycle and release (extract or deintercalate) lithium ions into a battery electrolyte solution during a battery charging cycle. Suitable cathode materials include inorganic compounds such as transition metal oxides, transition metal/lithium composite oxides, lithium/transition metal composite phosphates, transition metal sulfides, metal oxides, and transition metal silicates. Examples of transition metal oxides include $CoO_2$, $MnO$, $V_2O_5$, $V_6O_{13}$ and $TiO_2$. Transition metal/lithium composite oxides include lithium/cobalt composite oxides whose basic composition is approximately $LiCoO_2$, lithium/nickel composite oxides whose basic composition is approximately $LiNiO_2$, and lithium/manganese composite oxides whose basic composition is approximately $LiMn_2O_4$ or $LiMnO_2$. In each of these cases, part of the cobalt, nickel or manganese can be replaced with one or two metals such as Al, Ti, V, Cr, Fe, Co, Ni, Cu, Zn, Mg, Ga or Zr. Lithium/transition metal composite phosphates include lithium iron phosphates (including $LiFePO_4$), lithium iron phosphate fluorides (including $LiFePO_4F$), lithium manganese phosphates (including $LiMn_2(PO_4)_2$), lithium cobalt phosphates (including $LiCoPO_4$), lithium iron manganese phosphates and the like. Examples of useful metal oxides include $SnO_2$ and $SiO_2$. Examples of useful metal silicates include lithium iron orthosilicate. Particles can contain two or more of these cathode materials. In addition, mixtures of two or more types of cathode material particles can be used.

The particles of the cathode material suitably have an average longest dimension of up to 20 μm. Smaller particles are preferred. The particles preferably have an average longest dimension of up to 5 μm, and more preferably up to 500 nm, still more preferably up to 200 nm. Nanoparticles (those up to about 500 nm, especially up to 200 nm in longest dimension) are preferred because they have the highest surface area to volume ratios. However, this high surface area can also lead to unstable electrodes in the absence of surface coatings.

The anode material is one that can reversibly intercalate lithium ions during a battery charging cycle and release lithium ions into a battery electrolyte solution (with production of electrons) during a battery discharge cycle. Suitable anode materials include, for example, carbonaceous materials such as natural or artificial graphite, carbonized pitch, carbon fibers, porous glassy carbon, graphitized mesophase microspheres, furnace black, acetylene black and various other graphitized materials. Other materials such as lithium, silicon, germanium and molybdenum oxide are useful anode materials. Particles can contain two or more of these anode materials. In addition, mixtures of two or more types of anode material particles can be used.

The particles of the anode material suitably have an average longest dimension of up to 20 μm. Smaller particles are preferred. The particles preferably have an average longest dimension of up to 5 μm, and more preferably up to 500 nm, still more preferably up to 200 nm. Nanoparticles (those up to about 500 nm, especially up to 200 nm in longest dimension) are preferred because they have the highest surface area to volume ratios. However, this high surface area can also lead to unstable electrodes in the absence of surface coatings.

The binder is generally an organic polymer, such as a poly(vinylidene fluoride), polytetrafluoroethylene, a styrene-butadiene copolymer, an isoprene rubber, a poly(vinyl acetate), a poly(ethyl methacrylate), polyethylene, carboxymethylcellulose or nitrocellulose. 2-ethylhexylacrylate-acrylonitrile copolymers, and the like. The binder is generally nonconductive or at most slightly conductive.

An electrode can be assembled from the binder and the electrode particles in any convenient manner. The binder is typically used as a solution or in the form of a dispersion (as in the case of a latex). In many cases, the binder can simply be mixed with the electrode particles, formed into the appropriate shape and then subjected to conditions (generally including an elevated temperature) sufficient to remove the solvent or latex continuous phase.

The binder/particle mixture may be cast onto or around a support (which may also function as a current collector) or into a form. A suitable current collector for the anode is made of a metal or metal alloy such as copper, a copper alloy, nickel, a nickel alloy, stainless steel and the like. Suitable current collectors for the cathode include those made of aluminum, titanium, tantalum, alloys of two or more of these and the like.

The binder particle mixture may be impregnated into various types of mechanical reinforcing structures, such as meshes, fibers, and the like, in order to provide greater mechanical strength to the electrode. Upon removing the solvent or carrier fluid, the electrode particles become bound together by the binder to form a solid electrode. The electrode is often significantly porous.

Suitable methods for constructing lithium ion battery electrodes include those described, for example, in U.S. Pat. No. 7,169,511. The electrodes are each generally in electrical contact with or formed onto a current collector. A suitable current collector for the anode is made of a metal or metal alloy such as copper, a copper alloy, nickel, a nickel alloy, stainless steel and the like. Suitable current collectors for the cathode include those made of aluminum, titanium, tantalum, alloys of two or more of these and the like.

Other particulate materials may be incorporated into the electrode. These include conductive materials such as carbon particles, carbon nanotubes and the like.

In certain aspects of the invention, the resulting electrode is coated via an atomic layer deposition (ALD) process.

In ALD, the reaction which forms the coating is split into two or more half-reactions, by introducing gas phase reactants separately and alternatingly into the deposition chamber. The reactants are not capable of reacting with themselves under the conditions of the process. Each reactant reacts at the surface of the substrate, each in turn forming a mono-layer of deposited material. Excess amounts of reactant are removed from the reaction zone before introducing the next reactant.

Reaction by-products are removed as well, between successive introductions of the reagents. This procedure ensures that reactions occur at the surface of the substrate, rather than in the gas phase.

A purge gas is typically introduced between the alternating feeds of the reactants, in order to further help to remove excess reactants. A carrier gas, which is usually but not necessarily the same as the purge gas, generally (but not always necessarily), is introduced during the time each reactant is introduced. The carrier gas may perform several functions, including (1) facilitating the removal of excess reactant and reaction by-products, (2) distributing the reactant through the reaction zone, thereby helping to expose all substrate surfaces to the reactant and (3) in the case of applying the coating to the electrode particles, fluidizing a particulate substrate so that all particle surfaces become exposed to the reactant. The purge gas does not react undesirably with the ALD reactants or the deposited coating, or interfere with their reaction with each other at the surface of the metal particles.

A typical pattern of introducing reactants (in a two-reagent ALD reaction scheme is:

1. Optionally, introduce purge/fluidizing gas.
2. Introduce the first reagent or a mixture of carrier gas and the first reagent.
3. Introduce purge/fluidizing gas and/or pull a high vacuum to remove excess quantities of the first reagent as well as reaction by-products.
4. Introduce the second reagent or a mixture of carrier gas and the second reagent.
5. Introduce purge/fluidizing gas and/or pull a high vacuum to remove excess quantities of the second reagent and reaction by-products.
6. Repeat steps 2-5 until desired the coating thickness is obtained.

This process is adaptable to include any number of reagents within a single reaction cycle.

Reaction conditions are selected mainly to meet two criteria. The first criterion is that the reagents are gaseous under the conditions of the reaction. Therefore, temperature and pressure conditions are selected such that the reactants are volatilized. The second criterion is one of reactivity. Conditions, particularly temperature, are selected such that the desired reaction between the film-forming reagents (or, at the start of the reaction, the first-introduced reagent and the particle surface) occurs at a commercially reasonable rate.

The temperature of the reactions may range from 250-1000K. The temperature is preferably one at which the substrate is thermally stable and below the melting, decomposition and, if appropriate, glass transition temperature of the electrode or any components of the electrode.

Subatmospheric pressures will normally be required.

The progress of the reaction can be monitored using techniques such as transmission. Fourier transform infrared techniques, Auger electron spectroscopy, and mass spectrometry.

Such atomic layer deposition techniques permit the formation of deposits of up to about 0.3 nm in thickness per reaction cycle, and thus provide a means of extremely fine control over the deposited film thickness. The reactions are self-limited and can be repeated to sequentially deposit additional layers of the deposited material until a desired thickness is achieved. During the first reaction cycle, the first reagent will react with functional groups on the electrode to form a covalent bond to the electrode. Subsequent reaction cycles build the coating onto the electrode.

Deposition occurs on at least the exposed external surfaces of the electrode. In some cases, deposition has been seen to occur within the electrode, rather than only at the surface, indicating that some diffusion of the reactant occurs during the deposition process. At least some of this internal deposition is believed to be due to the vapor phase reactants entering into voids or pores that exist in the electrode material. In addition, some diffusion of the reactants may occur through the binder polymer. Some or all of this internal deposition of the reactants may occur at the surfaces of particles of electrode material that are positioned inside the electrode material.

The ability to obtain deposition of the coating material within the electrode material will of course depend somewhat on the thickness of the electrode material, as thicker materials will of course present a greater barrier to penetration of the reactants into the center of the material. In some embodiments the electrode material will have a thickness (smallest cross-sectional dimension) of no more than 200 microns, preferably no more than 50 microns and even more preferably no more than 25 microns at the time the ALD process is performed. The coated electrode material may be subsequently layered, folded or rolled into a material having a thicker cross-section.

When coating an electrode material, enough ALD reaction cycles are performed to provide a coating on the exterior surfaces of the electrode material which is at least 2 Ångstroms thick. The coating may be as thick as 100 Ångstroms or even more, but little benefit and in some cases even some detrimental effect is seen when the coating is about 50 nanometers. A coating thickness of 2 to 20 Ångstroms is preferred and a coating thickness of 2 to 10 Ångstroms is more preferred.

An alternative way of expressing coating thickness is through the number of ALD reaction cycles that are performed. Generally, at least two ALD reaction cycles are performed. Up to 50 or more cycles can be performed, but it is preferred to conduct up to 20 cycles, and more preferred to conduct up to about 10 cycles or up to about 7 cycles.

In other embodiments, the particles of the electrode material are coated via the ALD process before being assembled into the electrode. In these embodiments, the particles are preferably particles of a cathode material as described before. Whereas significant benefits have been seen in battery performance when particles of the cathode material are coated in this manner, it has been found that much smaller benefits are seen when anode material particles are coated prior to assembly into an electrode.

The ALD process as described above is generally applicable for coating the particles of electrode materials. In order to coat all particle surfaces, it is necessary to conduct the process in such a manner that the vapor phase reactants can flow easily between particles and make contact with the particle surfaces. This can be done by fluidizing a bed of the particles of electrode material, or by contacting the particles with the vapor phase reactants in a rotating tube or similar vessel. Methods for applying ALD coatings onto particles are described, for example in U.S. Pat. Nos. 6,613,383 and 6,713,177.

When particles are coated, the thickness of the coating may be from 2 to 100 Ångstroms or more, but is preferably no thicker than 20 Ångstroms and still more preferably no thicker than 10 Ångstroms. It has been found that when the coating is of a relatively non-conductive material, such as alumina, battery performance tends to drop as the coating thickness exceeds about 10 to 15 Ångstroms.

The composition of the deposited inorganic material can vary considerably. Among inorganic materials that can be applied readily via atomic layer deposition methods are binary materials, i.e., materials of the form $Q_xR_y$, where Q and R represent different atoms and x and y are numbers that reflect an electrostatically neutral material. Among the suitable binary materials are various inorganic oxides (such as silicon dioxide and metal oxides such as zirconia, alumina, silica, boron oxide, yttria, zinc oxide, magnesium oxide, $TiO_2$ and the like), inorganic carbides, particularly group 4, 6, 13 or 14 carbides such as tungsten carbide, boron carbide and titanium carbide; inorganic nitrides including groups 3, 13 or 14 nitrides such as silicon nitride, AlN and BN, inorganic sulfides such as gallium sulfide, tungsten sulfide and molybdenum sulfide, as well as inorganic phosphides. In addition, various metal coatings are useful, including bismuth, tin, cobalt, palladium, platinum, zinc, rhenium, molybdenum, antimony, selenium, thallium, chromium, platinum, ruthenium, iridium, germanium and tungsten. Alumina coatings are particularly useful, and are easy to deposit using ALD methods.

Oxide deposits can be formed on the electrode or the particle of electrode material using a binary (AB) reaction sequence as follows. The asterisk (*) indicates the atom that resides at the surface of the particle or coating, and Z represents oxygen or nitrogen. $M^1$ is an atom of a metal (or semimetal such as silicon), particularly one having a valence of 3 or 4, and X is a displaceable nucleophilic group. The reactions shown below are not balanced, and are only intended to show the reactions at the surface of the particles (i.e., not inter- or intralayer reactions).

$$M\text{-}Z\text{—}H^* + M^1X_n \rightarrow M\text{-}Z\text{-}M^1X^* + HX \quad (A1)$$

$$M\text{-}Z\text{-}M^1X^* + H_2O \rightarrow M\text{-}Z\text{-}M^1OH^* + HX \quad (B1)$$

In reaction A1, reagent $M^1X_n$ reacts with one or more $M^*\text{-}Z\text{—}H$ groups on the surface of the particle to create a new surface group having the form $\text{-}M^1X$. $M^1$ is bonded to the particle through one or more Z atoms. The $\text{-}M^1\text{-}X$ group represents a site that can react with water in reaction B1 to regenerate one or more hydroxyl groups. The hydroxyl groups formed in reaction B1 can serve as functional groups through which reactions A1 and B1 can be repeated, each time adding a new layer of $M^1$ atoms. Note that in some cases (such as, e.g., when $M^1$ is silicon, zirconium, titanium, boron, yttrium or aluminum) hydroxyl groups can be eliminated as water, forming $M^1\text{-}O\text{-}M^1$ bonds within or between layers. This condensation reaction can be promoted if desired by, for example, annealing at elevated temperatures and/or reduced pressures.

Binary reactions of the general type described by equations A1 and B1, where $M^1$ is silicon, are described more fully in J. W. Klaus et al, "Atomic Layer Controlled Growth of $SiO_2$ Films Using Binary Reaction Sequence Chemistry", *Appl. Phys. Lett.* 70, 1092 (1997) and O, Sheh et al., "Atomic Layer Growth of $SiO_2$ on Si(100) and $H_2O$ using a Binary Reaction Sequence", *Surface Science* 334, 135 (1995), both incorporated herein by reference. Binary reactions of the general type described by equations A1 and B1, where $M^1$ is aluminum, are described in A. C. Dillon et al, "Surface Chemistry of $Al_2O_3$ Deposition using $Al(CH_3)_3$ and $H_2O$ in a Binary reaction Sequence", *Surface Science* 322, 230 (1995) and A. W. Ott et al., "$Al_2O_3$ Thin Film Growth on Si(100) Using Binary Reaction Sequence Chemistry", *Thin Solid Films* 292, 135 (1997). Both of these references are incorporated herein by reference. General conditions for these reactions as described therein can be adapted to construct $SiO_2$ and $Al_2O_3$ coatings on particulate materials in accordance with this invention. Analogous reactions for the deposition of other metal oxides such as $ZrO_2$, $TiO_2$ and $B_2O_3$ are described in Tsapatsis et al. (1991) *Ind. Eng. Chem. Res.* 30:2152-2159 and Lin et al., (1992), *AIChE Journal* 38:445-454, both incorporated herein by reference.

A specific reaction sequence of the A1/B1 type that produces alumina is:

$$Al\text{—}(CH_3)^* + H_2O \rightarrow Al\text{—}OH^* + CH_4 \quad (A1A)$$

$$Al\text{—}OH^* + Al(CH_3)_3 \rightarrow Al\text{—}O\text{—}Al(CH_3)_2^* + CH_4 \quad (B1A)$$

This particular sequence of reactions is particularly preferred to deposit alumina, as the reactions proceed well at temperature below 350K. This particular reaction sequence tends to deposit $Al_2O_3$ ALD at a rate of ~1.2 Å per reaction cycle. Triethyl aluminum (TEA) can be used in place of trimethyl aluminum.

Analogous reaction sequences can be performed to produce nitride and sulfide deposits. An illustrative reaction sequence for producing a nitride coating is:

$$M\text{-}Z\text{—}H^* + M^1X_n \rightarrow M\text{-}Z\text{-}M^1X^* + HX \quad (A2)$$

$$M\text{-}Z\text{-}M^1X^* + NH_3 \rightarrow M\text{-}Z\text{-}M^1NH^* + HX \quad (B2)$$

Ammonia can be eliminated to form $M^1\text{-}N\text{-}M^1$ bonds within or between layers. This reaction can be promoted if desired by, for example, annealing at elevated temperatures and/or reduced pressures.

An illustrative reaction sequence for producing sulfide deposits is:

$$M\text{-}Z\text{—}H^* + M^1X_n \rightarrow M\text{-}Z\text{-}M^1X^* + HX \quad (A3)$$

$$M\text{-}Z\text{-}M^1X^* + H_2S \rightarrow M\text{-}Z\text{-}M^1SH^* + HX \quad (B3)$$

Hydrogen sulfide can be eliminated to form $M^1\text{-}S\text{-}M^1$ bonds within or between layers. As before, this reaction can be promoted by annealing at elevated temperatures and/or reduced pressures.

A suitable binary reaction scheme for depositing inorganic phosphide deposits is described in Ishii et al, *Crystal. Growth* 180 (1997) 15, incorporated herein by reference.

In the foregoing reaction sequences, preferred metals $M^1$ include silicon, aluminum, yttrium, boron, titanium, zinc, magnesium and zirconium. Suitable replaceable nucleophilic groups will vary somewhat with $M^1$, but include, for example, fluoride, chloride, bromide, alkoxy, alkyl, acetylacetonate, and the like. Specific compounds having the structure $M^1X_n$ that are of particular interest are silicon tetrachloride, tungsten hexafluoride, tetramethylorthosilicate ($Si(OCH_3)_4$), tetraethyl-orthosilicate ($Si(OC_2H_5)_4$), trimethyl aluminum (Al$(CH_3)_3$), triethyl aluminum ($Al(C_2H_5)_3$), other trialkyl aluminum compounds, yttrium acetylacetonate, cobalt acetylacetonate, and the like.

In addition, catalyzed binary reaction techniques such as described in U.S. Pat. No. 6,090,441, incorporated by reference, are suitable for depositing inorganic materials, especially oxide, nitride or sulfide coatings, most preferably oxide coatings. Reactions of this type can be represented as follows:

$$M\text{-}F_1 + C_1 \rightarrow M\text{-}F_1\text{—}C_1 \quad (A4a)$$

$$M\text{-}F_1\text{—}C_1 + F_2\text{-}M^1\text{-}F_2 \rightarrow M\text{-}M^1\text{-}F_2 + F_1\text{—}F_2 + C_1 \quad (A4b)$$

$$M\text{-}M^1\text{-}F_2 + C_2 \rightarrow M\text{-}M^1F_1\text{—}C_2 \quad (B4a)$$

$$M\text{-}M^1\text{-}F_1\text{—}C_2 + F_1\text{-}M\text{-}F_1 \rightarrow M\text{-}M^1\text{-}M\text{-}F_1 + F_1\text{—}F_2 + C_2 \quad (B4b)$$

$C_1$ and $C_2$ represent catalysts for the A4b and B4b reactions, and may be the same or different. $F_1$ and $F_2$ represent functional groups, and M and $M^1$ are as defined before, and can be the same or different. Reactions A4a and A4b together constitute the first part of a binary reaction sequence, and reactions B4a and B4b together constitute the second half of the binary reaction sequence. An example of such a catalyzed binary reaction sequence is:

$$Si-OH^*(particle) + C_5H_5N \rightarrow Si-OH-C_5H_5N^*$$

$$Si-OH-C_5H_5N^* + SiCl_4 \rightarrow Si-O-SiCl_3^* + C_5H_5N + HCl$$

$$Si-O-SiCl_3^* + C_5H_5N \rightarrow Si-O-SiCl_3-C_5H_5N^*$$

$$Si-O-SiCl_3-C_5H_5N^* + H_2O \rightarrow Si-O-SiOH^* + C_5H_5N + HCl$$

where the asterisks (*) again denote atoms at the surface of the particle. This general method is applicable to depositing various other materials, including zirconia or titania.

Suitable binary reaction schemes for depositing metals include those described in U.S. Pat. No. 6,958,174 entitled "A Solid Material Comprising a Thin Metal Film on its Surface and Methods for Producing the Same", which is incorporated herein by reference. A specific reaction scheme described therein involves sequential reactions of a substrate surface with a metal halide followed by a metal halide reducing agent. The metal of the metal halide is preferably a transition metal or a semimetallic element, including tungsten, rhenium, molybdenum, antimony, selenium, thallium, chromium, platinum, ruthenium, iridium, and germanium. The halide is preferably fluoride. The reducing agent is a silylating agent such as silane, disilane, trisilane and mixtures thereof. For depositing tungsten, the sequence of reactions can be represented as:

$$M-OH^*(particle) + Si_2H_6 \rightarrow M-Si^*_2H_5 \quad \text{(precursor reaction)}$$

$$M-Si^*_2H_5 + WF_6 \rightarrow M-W-F^* + Si_2H_6 \quad (A5)$$

$$M-W-F^* + Si_2H_yF_z \rightarrow M-W-Si^*_2H_5 + H_2 + SiH_aF_b \quad (B5)$$

Here, y, z, a and b represent positive integers that reflect an electrostatically neutral compound.

Another binary reaction scheme suitable for depositing a metal ($M^2$) on a particle having surface hydroxyl or amine groups can be represented as:

$$M^*-Z-H + M^2X_n \rightarrow M-Z-M^{2*}X + HX \quad \text{(precursor reaction)}$$

$$M-Z-M^2X^* + H_2 \rightarrow M-Z-M^2-H^* + HX \quad (B6)$$

$$M-Z-M^2-H^* + M^2(acac) \rightarrow M-Z-M^2-M^{2*}(acac) \quad (A6)$$

"Acac" refers to acetylacetonate ion, and X, Z and M are as defined before. Also as before, the asterisk (*) refers to an atom residing at the surface of the particle. By heating to a sufficient temperature, hydrogen bonded to the surface as $M^2$-H will thermally desorb from the surface as $H_2$, thereby generating a final surface composed of $M^2$ atoms. Cobalt, iron and nickel are preferred metals for coating according to reaction sequence A6/B6.

If particles are coated, they are formed into an electrode as described before.

The finished electrode is assembled into a lithium ion battery. The battery can be of any useful construction. A typical battery construction includes an anode and cathode, with a separator and the electrolyte solution interposed between the anode and cathode so that ions can migrate through the electrolyte solution between the anode and the cathode. The assembly is generally packaged into a case. The shape of the battery is not limited. The battery may be a cylindrical type containing spirally-wound sheet electrodes and separators. The battery may be a cylindrical type having an inside-out structure that includes a combination of pellet electrodes and a separator. The battery may be a plate type containing electrodes and a separator that have been superimposed.

At least one of the electrodes of the battery is or includes a coated electrode, or an electrode made by binding together coated particles of anode or cathode material, as described above. In some embodiments, the anode is a coated anode as described before. In other embodiments, the cathode is a coated cathode as described before. In still other embodiments, the cathode contains particles of cathode materials that have been coated and then assembled into the cathode using a binder.

In some particularly preferred embodiments, both the anode and the cathode are coated as described before. In other particularly preferred embodiments, the anode is coated as before, and the cathode contains particles of cathode materials that have been coated and then assembled into the cathode using a binder.

The electrodes are each generally in electrical contact with or formed onto a current collector. A suitable current collector for the anode is made of a metal or metal alloy such as copper, a copper alloy, nickel, a nickel alloy, stainless steel and the like. Suitable current collectors for the cathode include those made of aluminum, titanium, tantalum, alloys of two or more of these and the like.

The separator is interposed between the anode and cathode to prevent the anode and cathode from coming into contact with each other and short-circuiting. The separator is conveniently constructed from a nonconductive material. It should not be reactive with or soluble in the electrolyte solution or any of the components of the electrolyte solution under operating conditions. Polymeric separators are generally suitable. Examples of suitable polymers for forming the separator include polyethylene, polypropylene, polybutene-1, poly-3-methylpentene, ethylene-propylene copolymers, polytetrafluoroethylene, polystyrene, polymethylmethacrylate, polydimethylsiloxane, polyethersulfones and the like.

The electrolyte solution must be able to permeate through the separator. For this reason, the separator is generally porous, being in the form of a porous sheet, nonwoven or woven fabric or the like. The porosity of the separator is generally 20% or higher, up to as high as 90%. A preferred porosity is from 30 to 75%. The pores are generally no larger than 0.5 microns, and are preferably up to 0.05 microns in their longest dimension. The separator is typically at least one micron thick, and may be up to 50 microns thick. A preferred thickness is from 5 to 30 microns.

The basic components of the battery electrolyte solution are a lithium salt and a nonaqueous solvent for the lithium salt.

The lithium salt may be any that is suitable for battery use, including inorganic lithium salts such as $LiAsF_6$, $LiPF_6$, $LiB(C_2O_4)_2$, $LiBF_4$, $LiBF_2C_2O_4$, $LiClO_4$, $LiBrO_4$ and $LiIO_4$ and organic lithium salts such as $LiB(C_6H_5)_4$, $LiCH_3SO_3$, $LiN(SO_2C_2F_5)_2$ and $LiCF_3SO_3$. $LiPF_6$, $LiClO_4$, $LiBF_4$, $LiAsF_6$, $LiCF_3SO_3$ and $LiN(SO_2CF_3)_2$ are preferred types, and $LiPF_6$ is an especially preferred lithium salt.

The lithium salt is suitably present in a concentration of at least 0.5 moles/liter of electrolyte solution, preferably at least 0.75 moles/liter, up to 3 moles/liter and more preferably up to 1.5 moles/liter.

The nonaqueous solvent may include, for example, one or more linear alkyl carbonates, cyclic carbonates, cyclic esters, linear esters, cyclic ethers, alkyl ethers, nitriles, sulfones, sulfolanes, siloxanes and sultones. Mixtures of any two or more of the foregoing types can be used. Cyclic esters, linear alkyl carbonates, and cyclic carbonates are preferred types of nonaqueous solvents.

Suitable linear alkyl carbonates include dimethyl carbonate, diethyl carbonate, methyl ethyl carbonate and the like. Cyclic carbonates that are suitable include ethylene carbonate, propylene carbonate, butylene carbonate and the like. Suitable cyclic esters include, for example, γ-butyrolactone and γ-valerolactone. Cyclic ethers include tetrahydrofuran, 2-methyltetrahydrofuran, tetrahydropyran and the like. Alkyl ethers include dimethoxyethane, diethoxyethane and the like. Nitriles include mononitriles, such as acetonitrile and propionitrile, dinitriles such as glutaronitrile, and their derivatives. Sulfones include symmetric sulfones such as dimethyl sulfone, diethyl sulfone and the like, asymmetric sulfones such as ethyl methyl sulfone, propyl methyl sulfone and the like, and their derivatives. Sulfolanes include tetramethylene sulfolane and the like.

Some preferred solvent mixtures include mixtures of a cyclic carbonate with a linear alkyl carbonate at a weight ratio of from 15:85 to 40:60; a cyclic carbonate/cyclic ester mixture at a weight ratio of from 20:80 to 60:40: a cyclic carbonate/cyclic ester/linear alkyl carbonate mixture at weight ratios of 20-48:50-78:2-20; cyclic ester/linear alkyl carbonate mixtures at a weight ratio of from 70:30 to 98:2.

Solvent mixtures of particular interest are mixtures of ethylene carbonate and propylene carbonate at a weight ratio of from 15:85 to 40:60; mixtures of ethylene carbonate and dimethyl carbonate at a weight ratio of from 15:85 to 40:60; mixtures of ethylene carbonate, propylene carbonate and dimethyl carbonate at a weight ratio of 20-48:50-78:2-20, and mixtures of propylene carbonate and dimethyl carbonate at a weight ratio of from 15:85 to 40:60.

Various other additives may be present in the battery electrolyte solution. These may include, for example, additives which promote the formation of a solid electrolyte interface at the surface of a graphite electrode; various cathode protection agents; lithium salt stabilizers; lithium deposition improving agents; ionic solvation enhancers; corrosion inhibitors; wetting agents; flame retardants; and viscosity reducing agents. Many additives of these types are described by Zhang in "A review on electrolyte additives for lithium-ion batteries", *J. Power Sources* 162 (2006) 1379-1394.

Agents which promote solid electrolyte interface (SEI) formation include various polymerizable ethylenically unsaturated compounds, various sulfur compounds, as well as other materials. Suitable cathode protection agents include materials such as N,N-diethylaminotrimethylsilane and $LiB(C_2O_4)_2$. Lithium salt stabilizers include LiF, tris(2,2,2-trifluoroethyl)phosphite, 1-methyl-2-pyrrolidinone, fluorinated carbamate and hexamethylphosphoramide. Examples of lithium deposition improving agents include sulfur dioxide, polysulfides, carbon dioxide, surfactants such as tetraalkylammonium chlorides, lithium and tetraethylammonium salts of perfluorooctanesulfonate, various perfluoropolyethers and the like. Crown ethers can be suitable ionic solvation enhancers, as are various borate, boron and borole compounds. $LiB(C_2O_4)_2$ and $LiF_2C_2O_4$ are examples of aluminum corrosion inhibitors. Cyclohexane, trialkyl phosphates and certain carboxylic acid esters are useful as wetting agents and viscosity reducers. Some materials, such as $LiB(C_2O_4)_2$, may perform multiple functions in the electrolyte solution.

The various other additives may together constitute up to 20%, preferably up to 10% of the total weight of the battery electrolyte solution. The water content of the resulting battery electrolyte solution should be as low as possible. A water content of 50 ppm or less is desired and a more preferred water content is 30 ppm or less.

The battery is preferably a secondary (rechargeable) lithium battery. In such a battery, the discharge reaction includes a dissolution or delithiation of lithium ions from the anode into the electrolyte solution and concurrent incorporation of lithium ions into the cathode. The charging reaction, conversely, includes an incorporation of lithium ions into the anode from the electrolyte solution. Upon charging, lithium ions are reduced on the anode side, at the same time, lithium ions in the cathode material dissolve into the electrolyte solution.

Batteries containing a coated cathode, or a cathode made from coated particles of cathode material, in accordance with the invention, are sometimes characterized by having excellent cycling stability. The same effect is often seen when the battery contains a coated anode of the invention.

Cycling stability can be evaluated by running the battery through a fixed number of charge/discharge cycles, at a given charge/discharge rate, and measuring the capacity of the battery at the start and at the end of the evaluation. Capacity tends to fall as the battery continues to be charged and discharged. For example, after 100 1C charge/discharge cycles, the capacity of the battery often drops to 60-70% of the starting capacity. However, when the battery electrolyte solution contains one or more phosphorus-sulfur compounds, carbonates that contain carbon-carbon unsaturation and/or sultone compounds, as described before, in addition to the aromatic phosphorus compound, the cycling stability tends to be significantly better, often approximating 80% or more capacity retention after 100 1C charge/discharge cycles.

The battery of the invention can be used in industrial applications such as electric vehicles, hybrid electric vehicles, plug-in hybrid electric vehicles, aerospace, e-bikes, etc. The battery of the invention is also useful for operating a large number of electrical and electronic devices, such as computers, cameras, video cameras, cell phones, PDAs, MP3 and other music players, televisions, toys, video game players, household appliances, power tools, medical devices such as pacemakers and defibrillators, among many others.

The following examples are intended to illustrate the invention, but not to limit the scope thereof. All parts and percentages are by weight unless otherwise indicated.

EXAMPLES 1-3 AND COMPARATIVE SAMPLES A

ALD Deposition of Alumina Coating onto $LiCoO_2$ Particles

Alumina ALD films are grown directly onto 7-10 μm $LiCoO_2$ particles using a rotary reactor. The reagents are trimethylaluminum (TMA) and water. The general reaction scheme is that shown in equations A1a and B1a above. TMA is dosed to 1 Torr, allowed time to react and then evacuated. The reactor is then purged with 20 Torr nitrogen. Water is dosed to 1 Torr, allowed to react and then evacuated, and then the reaction is again purged with 20 Torr nitrogen. These steps constitute one ALD cycle. The deposition is performed at 180° C.

For example 1, two ALD cycles are performed on the $LiCoO_2$ powder. For Example 2, six ALD cycles are performed on the $LiCoO_2$ powder. For Comparative Sample A, no ALD cycles are performed and 10 ALD cycles are performed for Comparative Sample C. Approximate coating thicknesses are 2-3 Ångstroms for Example 1, 6-10 Ångstroms for Example 2, 10-15 Ångstroms for Example 3, and zero Ångstroms for Comparative Example A.

Electrodes are made from the powders by forming a slurry of the powders, acetylene black and polyvinylidene fluoride at an 83:7.5:9.5 weight ratio, and spreading the slurry onto a piece of aluminum foil. The resulting electrodes are assembled into a 2032-type coin cell, with lithium metal foil as the counter electrode, porous 20 μm polypropylene/polyethylene/polypropylene trilayer film as the separator, and 1 M $LiPF_6$ dissolved in a 1:1 mixture of ethylene carbonate and dimethylcarbonate as the electrolyte.

Galvanic charge-discharge cycling is performed in an argon-filled drybox in a oven controlled at room temperature. Cycling is performed in the potential range of 3.3-4.5V (vs. $Li/Li^+$) at a current density of 0.1 C (14 mA/g) for the first two cycles and 1 C for the subsequent cycles.

Figure 1:
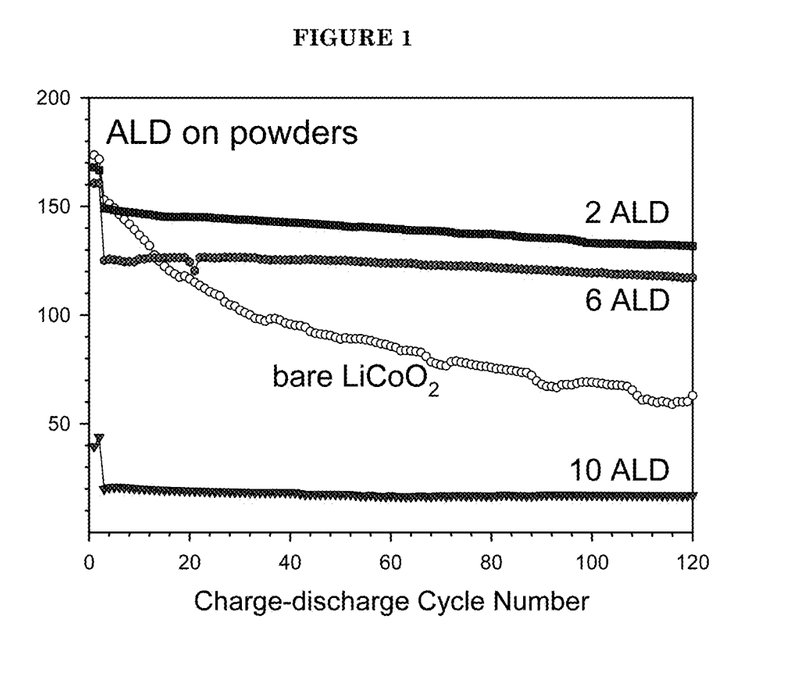
FIG. 1 is a graph showing the specific discharge capacity versus charge-discharge cycle number for three batteries made in accordance with the invention (Ex. 1-3 below) and a comparative battery (Comp. Sample A).

Results are shown graphically in FIG. 1. When the $LiCoO_2$ powder is uncoated (Comp. Sample. A, "bare $LiCoO_2$" results in FIG. 1), the specific discharge capacity of the batteries deteriorates steadily with increasing charge-discharge cycle number, falling from an initial value of about 170 mA-h/g to about 60 mA-H/g over 120 cycles.

When the particles are coated with only 2 ALD cycles (Ex. 1, "2 ALD" results in FIG. 1), a nearly steady value of about 150 mA-h/g is maintained over the 120 cycles of the evaluation. When the particles are coated with 6 ALD cycles ("6 ALD" results in FIG. 1), the specific discharge capacity is slightly lower, about 125 mA-h/g, but again this value is nearly maintained over the 120 cycles of the evaluation. When the ALD coating is 10 ALD cycles thick (Ex. 3), specific discharge capacity is further reduced, but again nearly constant over the 120 cycles of the test.

EXAMPLE 4

A $LiCoO_2$ electrode is assembled as described for Comparative Sample 1. This electrode is then coated with two alumina-ALD cycles, using the same general process as described for Examples 1-3. A 2032 coin cell is assembled using this electrode, again in the same manner described in previous examples, and tested as described before. Results are indicated graphically in FIG. 2. Results from Comparative Sample A are reproduced in FIG. 2 for comparison.

Figure 2:
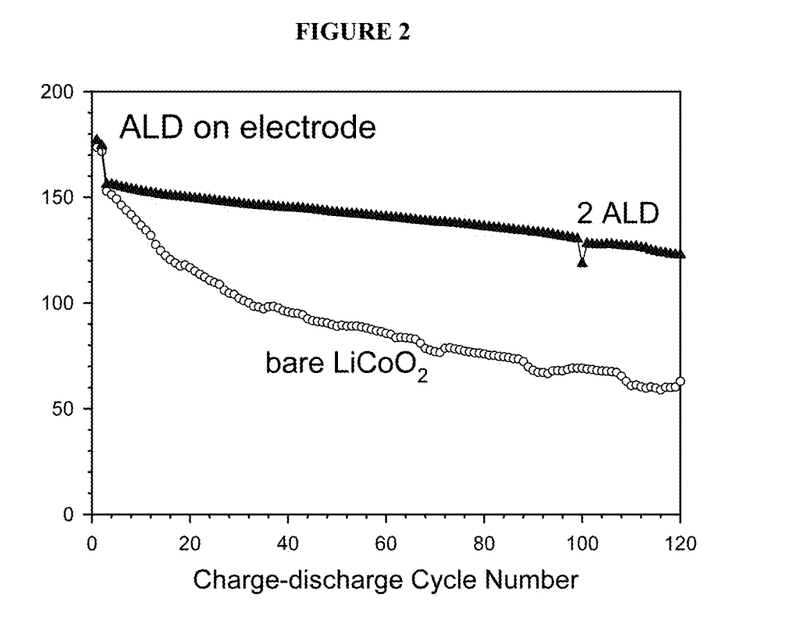
FIG. 2 is a graph showing the specific discharge capacity versus charge-discharge cycle number for a battery made in accordance with the invention (Ex. 4 below) and a comparative battery (Comp. Sample A).

As can be seen in FIG. 2, the ALD-coated electrode provides for much better capacity stability than the uncoated electrode of Comparative Sample A. Example 4 shows only a gradual decline in capacity from about 150 mA-h/g to about 130 mA-h/g over the 120 cycles of the evaluation.

EXAMPLE 5 AND COMPARATIVE SAMPLE B

A natural graphite anode is formed by slurrying together 5 micron natural graphite particles and polyvinylidene fluoride at a 90:10 weight ratio and spreading the slurry onto a copper foil (which serves as a current collector). Using the general process described in Examples 1-3, five alumina ALD cycles are performed on this anode. A coin cell is manufactured using this anode as described in previous examples, using a $LiCoO_2$ counterelectrode such as that described in Comparative Sample A. The resulting battery is Example 5.

A similar battery is made in the same manner, except the anode is not subjected to alumina ALD cycles. This battery is Comparative Sample B.

Figure 3:
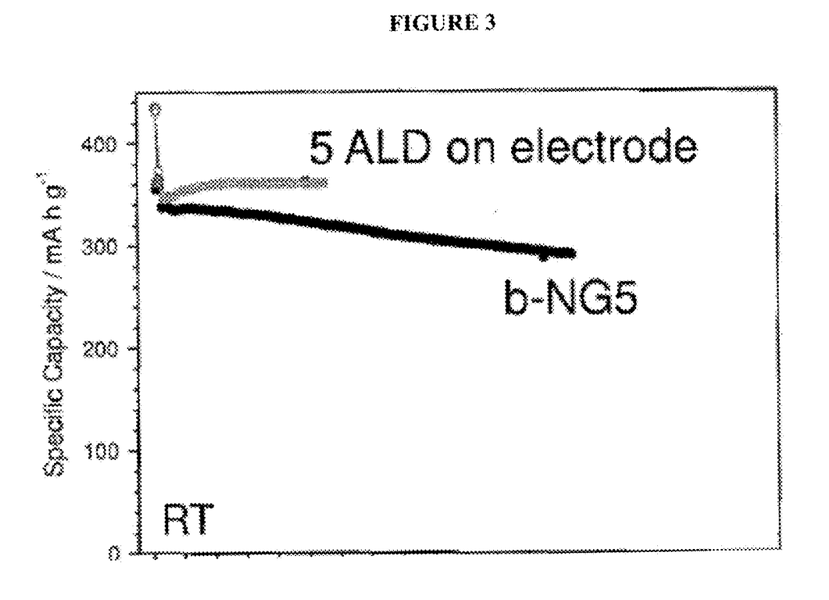
FIG. 3 is a graph showing the specific discharge capacity at room temperature versus charge-discharge cycle number for a battery made in accordance with the invention (Ex. 5 below) and a comparative battery (Comp. Sample B).
Figure 3A:
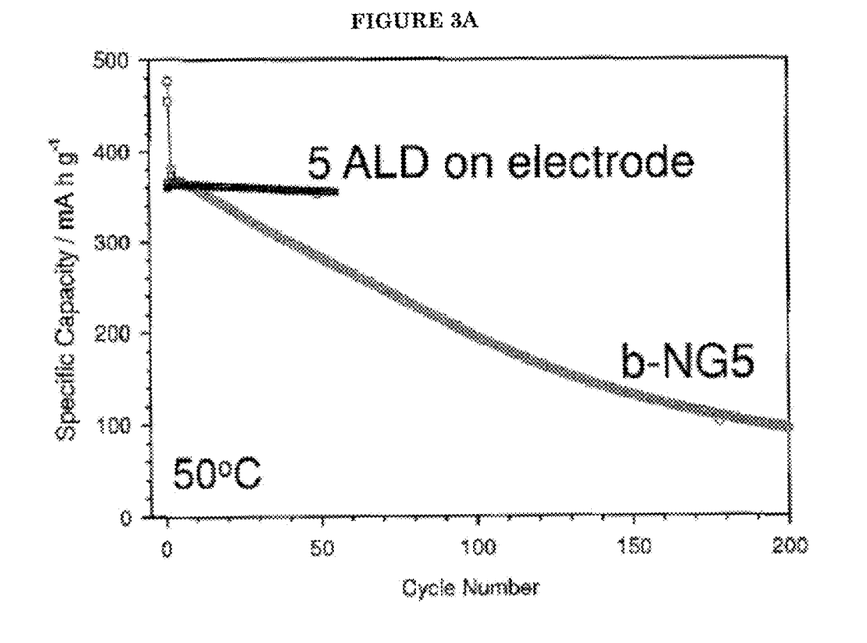
FIG. 3A is a graph showing the specific discharge capacity at 50° C. versus charge-discharge cycle number for a battery made in accordance with the invention (Ex. 5 below) and a comparative battery (Comp. Sample B).

Charge/discharge cycling is performed on battery Example 5 and Comparative Sample B as described in the earlier examples at both room temperature and at 50° C. Results are shown graphically in FIGS. 3 and 3A. In FIG. 3, it is seen that the battery with the uncoated anode loses capacity quickly upon cycling, whereas battery Example 5 maintains its capacity. In FIG. 3A, it is seen that the loss of capacity is accelerated at 50° C. for Comparative Sample B, but again little loss of capacity is seen for battery Example 5. These results show the very significant effect of coating the anode with a very thin alumina coating via the ALD process.

For further comparison, a sample of the same 5 micron natural graphite particles is coated with 5 alumina ALD cycles. Part of these coated particles are formed into an anode is formed by slurrying them together with polyvinylidene fluoride at a 90:10 weight ratio and spreading the slurry onto a copper foil (which serves as a current collector) (Comp. Sample C). Another portion are formed into a second electrode in the same manner, except some acetylene black is incorporated into the formulation in an attempt to enhance electrode performance (Comp. Sample D). Coin cells are assembled from each of these anodes as before, and the cells are subjected to charge/discharge cycling as before. Results are indicated graphically in FIG. 4. The results from Comparative Sample B are repeated in FIG. 4 for comparison purposes.

Figure 4:
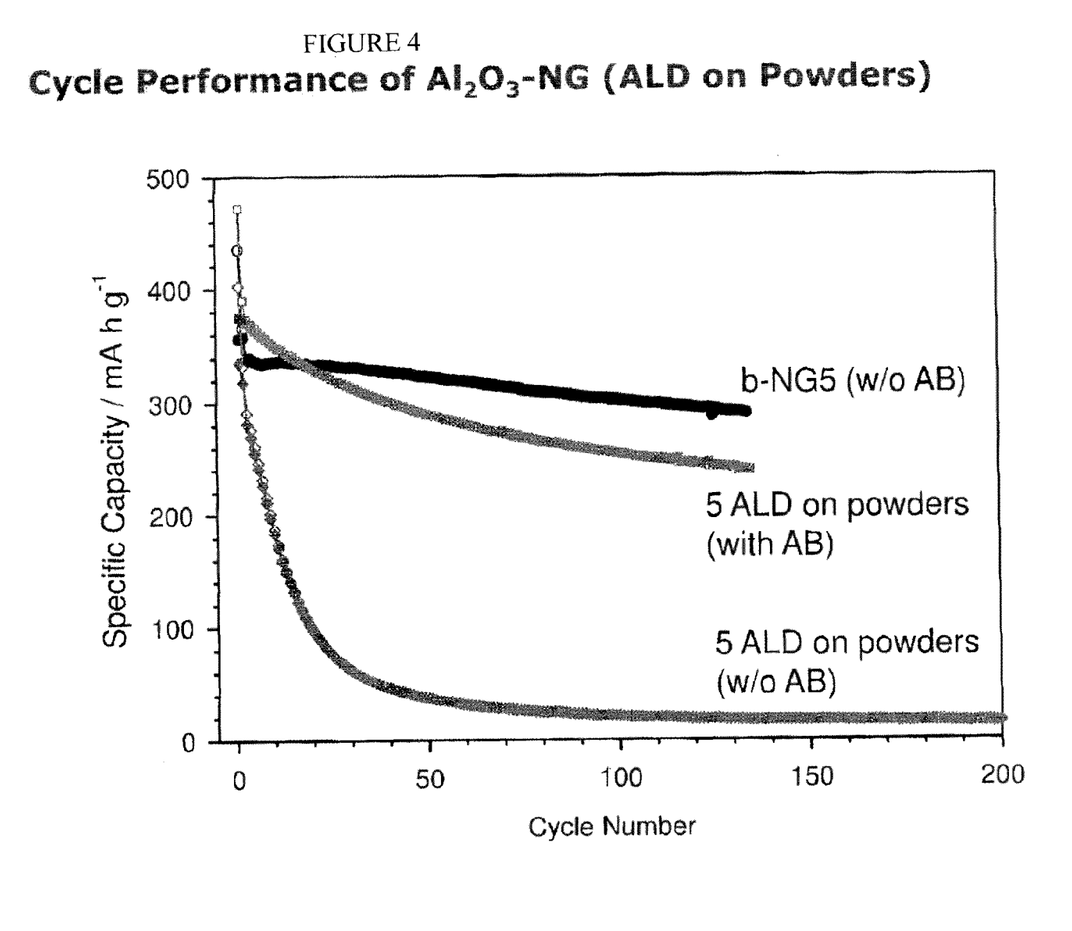
FIG. 4 is a graph showing the specific discharge capacity versus charge-discharge cycle number for three comparative batteries (Comp. Samples B, C and D).
Figure 5:
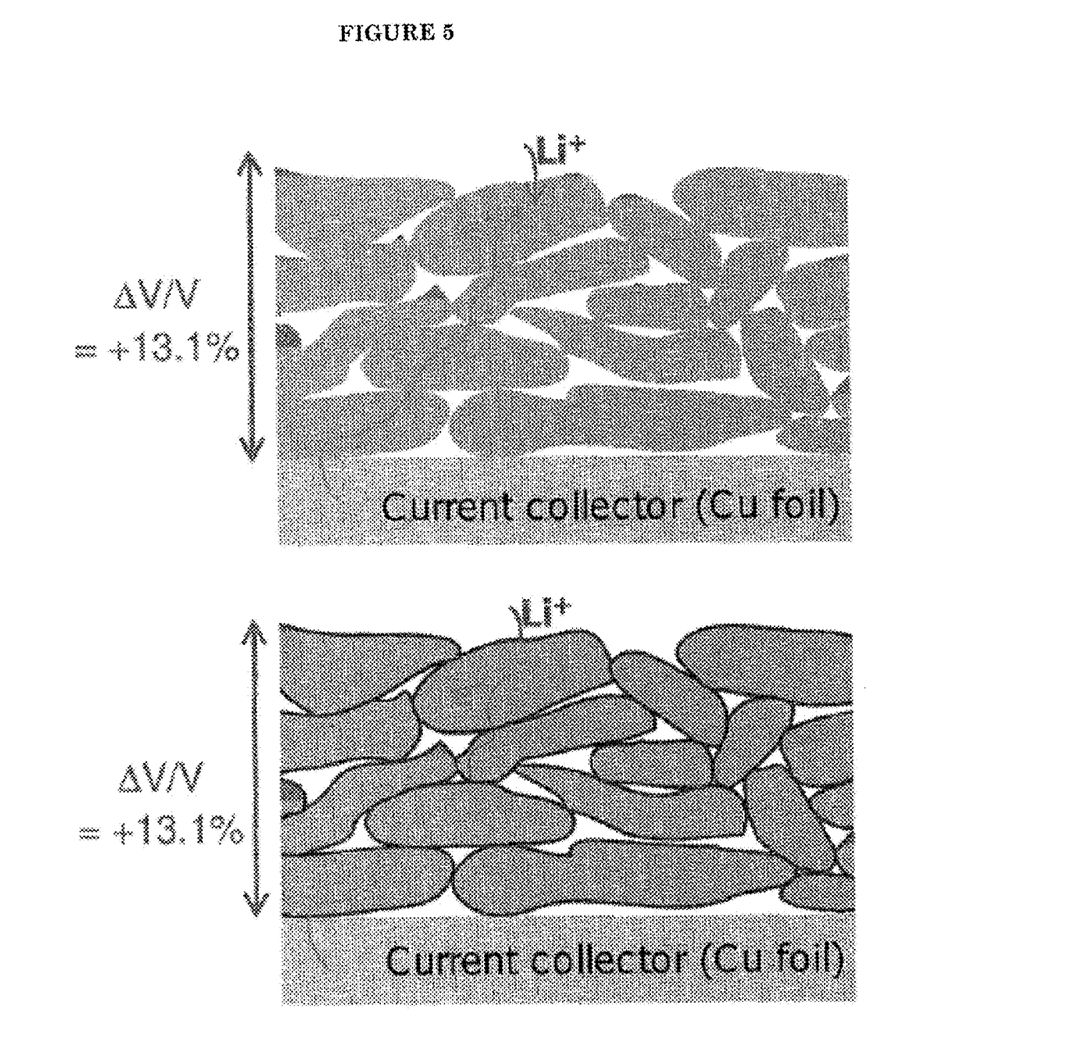
FIG. 5 is an enlarged front view of a section of an electrode having uncoated carbon particles, and of a second electrode having coated carbon particles.

The results indicated in FIG. 4 show that when the natural graphite particles are coated, capacity retention is much poorer than even for the control electrode (which is not subjected to any alumina ALD treatment). The results shown in FIGS. 3, 3A and 4 show that, in the case of graphite anodes, an ALD coating provides improved results when performed on the electrode, rather than on the starting natural graphite particles. These results are unexpected. FIG. 5 illustrates a hypothetical explanation for this phenomenon. The bottom view in FIG. 5 illustrates the hypothesized structure of an electrode formed from ALD-coated natural graphite particles 5. All particle surfaces are coated with alumina coatings 7, which form a barrier to electrons that traverse through the electrode structure along path 8 towards the current collector 6. This barrier is hypothesized to account for the loss of capacity through the charge/discharge cycling. The top view illustrates the hypothesized structure of the ALD-coated electrode. In that case, no ALD coating is applied at spots where the natural graphite particles 5 are in contact with each other, which allows electrons to flow directly from particle to particle within the electrode, without passing through an alumina layer, as shown by path 8. However, an alumina layer is provided onto exposed layers of the particles, protecting them and in that way improving the cycling performance of the battery.

The invention claimed is:

1. A process for preparing a lithium ion battery electrode, comprising shaping a mixture of particles of a cathode or anode material and a binder to form a shaped lithium ion battery electrode in which the particles are held together by the binder, and applying an alumina coating having a thickness from 2 to 20 Ångstroms to the shaped lithium ion battery electrode via an atomic layer deposition process, wherein during the atomic layer deposition process, reactants applied during the atomic layer deposition process diffuse through the binder and react at the surface of the particles of the cathode or anode material to coat the particles of cathode or anode material in the electrode.

2. The process of claim 1, wherein the particles have a longest dimension of up to 5 μm.

3. The process of claim 1, wherein the particles are of a cathode material.

4. The process of claim 3, wherein the cathode material is $CoO_2$, $MnO$, $V_2O_5$, $V_6O_{13}$ a lithium/cobalt composite oxide, a lithium/nickel composite oxide, lithium/manganese composite oxides whose basic composition is approximately $LiMn_2O_4$ or $LiMnO_2$, a lithium iron phosphate, a lithium iron phosphate fluoride, a lithium manganese phosphate, a lithium cobalt phosphates, a lithium iron manganese phosphate, $SnO_2$, $SiO_2$, lithium iron orthosilicate or a mixture of two or more thereof.

5. The process of claim 1, wherein the particles are of an anode material.

6. The process of claim 5 wherein the anode material is natural or artificial graphite, carbonized pitch, a carbon fiber, porous glass carbon, a graphitized mesophase microsphere, furnace black, acetylene black, lithium, silicon, germanium, molybdenum oxide or a mixture of two or more thereof.

* * * * *